(No Model.)
T. J. DEWEES.
SPLICE COVERING FOR ELECTRIC WIRES.
No. 515,905. Patented Mar. 6, 1894.
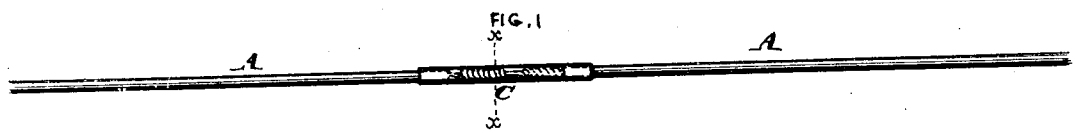
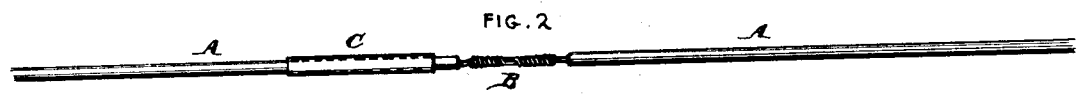

UNITED STATES PATENT OFFICE.

THOMAS J. DEWEES, OF PALMYRA, NEW JERSEY, ASSIGNOR TO THE ELECTRIC CABLE CONSTRUCTION AND MAINTENANCE COMPANY, OF PENNSYLVANIA.

SPLICE-COVERING FOR ELECTRIC WIRES.

SPECIFICATION forming part of Letters Patent No. 515,905, dated March 6, 1894.

Application filed July 25, 1891. Serial No. 400,714. (No model.)

*To all whom it may concern:*

Be it known that I, THOMAS J. DEWEES, of Palmyra, county of Burlington, State of New Jersey, have invented an Improvement in Splice-Coverings for Electric Wires, of which the following is a specification.

My invention relates to splice coverings for electric wires, and consists of certain improvements which are fully set forth in the following specification and are shown in the accompanying drawings which form a part thereof.

The object of my invention is to form an efficient and economical insulating sheath or covering for the splices of electric wires, or for covering other exposed portions thereof, by which the exposed portion of the wires may be thoroughly insulated and protected and may be kept free from moisture.

It is also the object of my invention to form a sheath or covering of the least possible expense and one which may be quickly and easily applied.

In carrying out my invention I employ a tubular sheath of paper of sufficient length to cover the splice or exposed portion, which may be readily slipped over the free end of one of the wires before the splice is formed and may then be drawn down to cover the splice or exposed connection. This tubular sheath or covering of paper may be held in place in any convenient manner, or it may be made to fit sufficiently tightly over the insulating covering of the wires to be held in place by simple contact therewith. The paper sheath or covering may be filled with any suitable drying substance to absorb any moisture that may be present in the wire and may subsequently have an absorbent covering placed upon its outer surface.

In the drawings:—Figure 1 is a plan view of a spliced electric wire having my improved spliced covering applied thereto. Fig. 2 is a similar view of the same showing the sheath or covering before it is drawn over the splice; and Fig. 3 is a cross sectional view on an enlarged scale through the splice and covering taken on the line $x$—$x$ of Fig. 1.

A, A, are two insulated electric wires joined together by the splice B. It is immaterial to my invention in what particular manner or of what material the insulating covering of these wires A. A. is formed.

C is the paper sheath or covering of a tubular shape which is adapted to cover the exposed ends of the wires A, A, forming the splice B, with its ends extending slightly over the insulating covering of the wires so as to thoroughly protect the splice.

D is a filling of moisture absorbing material which may be placed within the paper sheath C.

In applying the sheath C, it may be placed over the free end of one of the wires A before the splice is formed. The splice B is then made as shown in Fig. 2 and the sheath or covering is slipped down into position over the exposed wires as, is shown in Fig. 1. The covering C may be formed from a long paper tube which may be subsequently cut into the desired lengths, and thoroughly dried to expel all moisture. The paper tube thus forms an exceedingly economical and easily applied insulating sheath.

Having now described my invention, what I claim as new, and desire to secure by Letters Patent, is—

1. The combination of two insulated electric wires having the insulation of the adjacent ends removed and the conductors twisted together to form a joint having a diameter of substantially that of the insulated part of the wires, with a tubular sheath of paper having an internal diameter substantially equal to that of the twisted joint and supported at its middle directly by the twisted joint and at its ends by the insulation of the two wires.

2. The combination of two insulated electric wires having the insulation of the adjacent ends removed and the conductors twisted together to form a joint having a diameter of substantially that of the insulated part of the wires, with a tubular sheath of paper having an internal diameter substantially equal to that of the twisted joint and supported at its middle directly by the twisted joint and at its ends by the insulation of the wires, and a filling of moisture absorbing material within the tubular sheath and between the ends of the insulation of the two wires.

3. As a splice covering for electric wires, a sheath composed of paper formed into a short hollow tube of a length greater than the exposed juncture to be covered and of a diameter approximately equal to but slightly in excess of diameter of the wires and their insulating covering so that the paper sheath may rest at its ends directly upon the insulating covering of the wires and may form a covering over the joint of the bared ends of the wires.

In testimony of which invention I have hereunto set my hand.

THOS. J. DEWEES.

Witnesses:
ERNEST HOWARD HUNTER,
JOHN A. BRAMLEY.